June 24, 1969
W. KNAPP
3,451,511

LIQUID COOLED HYDRODYNAMIC BRAKE SYSTEM FOR MOTOR VEHICLES

Filed Oct. 2, 1967

Wilhelm Knapp
INVENTOR.

BY Karl F. Ross
Attorney

United States Patent Office 3,451,511
Patented June 24, 1969

3,451,511
LIQUID COOLED HYDRODYNAMIC BRAKE
SYSTEM FOR MOTOR VEHICLES
Wilhelm Knapp, Bad Homburg, Germany, assignor to
Alfred Teves G.m.b.H., Frankfurt am Main, Germany,
a corporation of Germany
Filed Oct. 2, 1967, Ser. No. 672,121
Int. Cl. F16d 57/00, 65/78
U.S. Cl. 188—90                                10 Claims

ABSTRACT OF THE DISCLOSURE

An automotive-vehicle brake system for a vehicle whose engine-cooling system is heated by a hydrodynamic brake in an operative state thereof. A temperature-sensitive switch in the cooling system line operates a valve connected with said hydrodynamic brake for inactivating the hydrodynamic brake upon the temperature in the cooling system exceeding a predetermined level.

Figure 1:
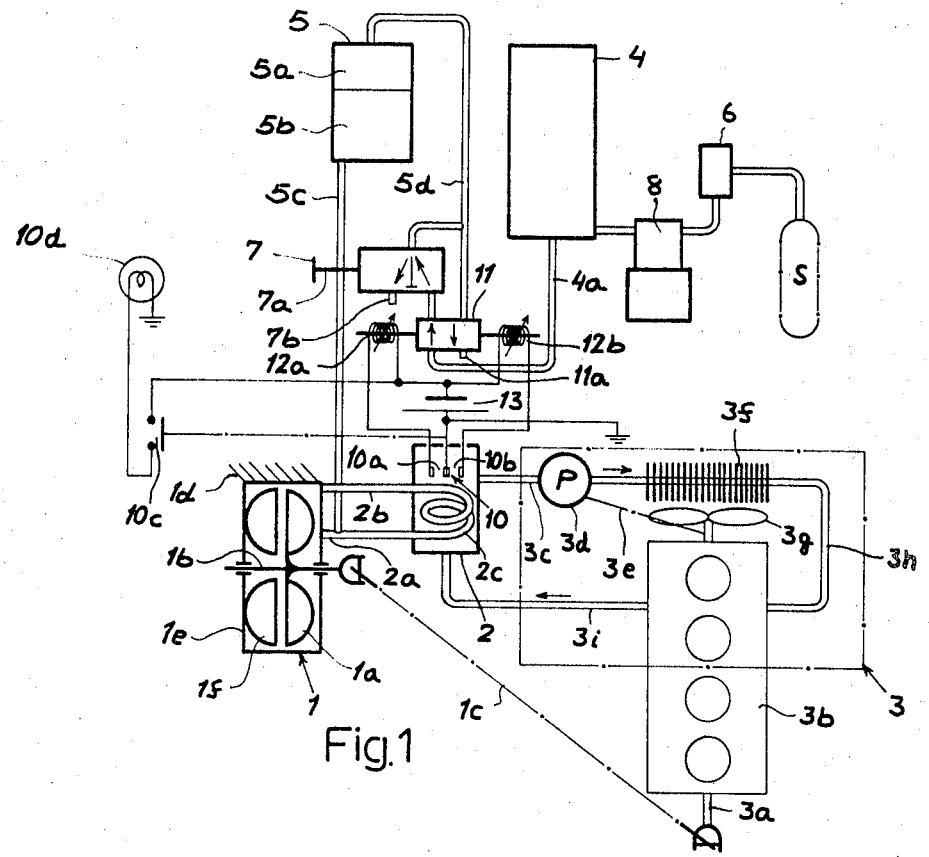

My present invention relates to a hydrodynamic brake system and, more particularly, to a hydrodynamic decelerator for heavy-duty automotive vehicles (e.g. trucks and semi-trailers), wherein the kinetic braking energy of the hydrodynamic brake is transferred to the cooling system of the vehicle engine.

It has already been proposed to provide hydrodynamic brake or decelerator systems for restricting rotation of a shaft (e.g. the drive shaft of an automotive vehicle) relative to a stationary decelerator member. In such arrangements, the hydrodynamic brake or decelerator generally comprises a rotor in the form of a toroidal shell half connected with the shaft to be braked and a complementary shell half forming a stator and mounted upon a support, the shells defining an annular chamber or a plurality of segmental chambers whose vanes circulate a hydraulic fluid by pumping action through a heat exchanger in which the heat generated by the pumping action is dissipated. When hydraulic fluid is supplied under pressure to this decelerator, friction is created which produces heat in dependence upon the degree of impediment by the fluid to rotation of the shaft, the heat being hereinafter referred to a "kinetic braking heat." In some cases, a separate heat exchanger is provided to dissipate the thermal energy of the braking action into the atmosphere, although a more common technique is to dissipate the thermal energy by indirect liquid-liquid heat transfer into the cooling system of a water-cooled automotive engine. Of course, the thermal energy is dissipated in turn by the cooling system into the atmosphere via the radiator of the vehicle and the fan blades driven by its energy.

Such systems find their most practical utility in heavy-duty automotive vehicles such as trucks and semi-trailers which are difficult to slow solely with friction brakes. Thus the power shaft, connected with the crankshaft of the engine by the usual universal couplings or cardan joints, may be provided with a hydraulic decelerator which is designed to provide liquid-friction braking which is most effective at relatively high vehicle speeds with the final brake action resulting from conventional mechanical-friction wheel braking. Such brakes are most effective after the vehicle has initially been slowed. Systems of this character are described in the commonly assigned Patent Nos. 3,265,162 of Aug. 9, 1966, and 3,302,755 of Feb. 7, 1967 as well as in the commonly assigned copending application Ser. No. 669,941, filed Sept. 22, 1967 entitled, Brake System, this application representing improvements in hydrodynamic brake arrangements and having been filed by J. R. Botterill, Hans-Christof Klein and Heinrich Oberthür. In the patented systems, the vehicle-brake system includes a hydraulic decelerator coupled with the shaft and has a rotor member mounted thereon while a relatively stationary stator member is connected with the vehicle chassis for reducing the rotor speed of the shaft upon the delivery of hydraulic fluid under pressure to the decelerator. To permit the shaft to be brought to standstill, an operation which cannot be effectively carried out merely by the control of fluid pressure in the hydraulic decelerator chambers, there is provided a fluid-responsive mechanical-friction brake means in the decelerator, the latter brake being energizable for frictionally interconnecting the relatively rotatable decelerator members. The hydrodynamic brake structure may be of the type described in U.S. Patent No. 1,297,225 and No. 2,241,189.

In the aforementioned copending application, it has been pointed out that hydrodynamic brakes of earlier types have had a significant disadvantage in that, even when the decelerator was not actuated by fluid pressurization, some pumping action continued, resulting in fluid loss, deterioration of the fluid and power loss. Accordingly, an improved system is there suggested which obviates this disadvantage by energizing or de-energizing the hydrodynamic brake via a gas-pressurized charging cylinder adapted to be subjected also to negative or sub-atmospheric pressure and thereby withdraw the fluid from the hydraulic decelerator when brake operation is not desired.

In hydrodynamic brake arrangements in which the kinetic brake energy is dissipated in the form of heat into the automotive engine cooling system, another inconvenience arises. Especially when the hydrodynamic brake is operable for long periods, i.e. for prolonged descents through hilly or mountainous terrain, and with heavily laden vehicles, the amount of heat transferred to the engine cooling system from the hydrodynamic brake system may be sufficient to overheat the engine and vaporize the cooling water with all of the well-known dangers.

It is, therefore, an object of the present invention to provide an improved hydrodynamic brake system, especially for heavy automotive vehicles having circulated-water cooling systems, wherein over-heating of the engine by thermal over-load from the hydrodynamic brake is avoided.

This object and others which will become apparent hereinafter are attained, in accordance with the present invention, by providing, in a hydrodynamic brake system having a hydraulic decelerator energizable with hydraulic fluid under pressure to brake a shaft of a motor vehicle driven by its water-cooled engine, and a heat exchanger for dissipating the kinetic brake energy of the hydrodynamic decelerator into the cooling system of the engine, a sensing means responsive to the temperature of the cooling system and connected with control means for the hydraulic decelerator for deactivating the decelerator upon the attainment of a predetermined maximum temperature in the water-cooling system of the engine, thereby preventing further transfer of heat to the latter by the hydrodynamic brake. The sensing means, according to a specific feature of this invention, comprises a temperature-responsive switch whose sensing element is disposed in the water-circulating path of a heat exchanger through which the cooling water and the hydrodynamic brake fluid are circulated in indirect liquid-liquid heat exchange, the switch being connected in circuit wth an electromagnetcally operable valve forming part of a fluid-pressurization network for the hydrodynamic brake and controlling the emptying or filling of the hydrodynamic decelerator in dependence upon the temperature of the cooling water and upon an increase in the temperature to a preset level above which further heat transfer to the cooling network is undesirable. The temperature-responsive switch reactivates the hydrodynamic brake when the temperature of the cooling system falls to a lower level. The control means may have still another position in which the hydrodynamic brake can be fully cut out in response to a manual command of the vehicle operator.

According to still another feature of this invention, circuit means is provided between the switch and an indicator at the dashboard of the automotive vehicle to generate an acoustic or optical signal to alert the driver when the hydrodynamic brake is deactivated as a consequence of a rise in temperature in the engine-cooling network. Advantageously, the deactivation of the hydrodynamic decelerator is effected via a charging cylinder of the type set forth in the afore-identified copending application and which can be subjected, alternatively, to negative and positive pressure. Thus, the deactivation can result from the application of suction to the charging cylinder so as to withdraw the hydrodynamic fluid from the decelerator and render the same pressureless. When the hydrodynamic decelerator is reactivated, the hydrodynamic fluid is driven into it from the air/liquid cylinder from pressure released by a compressed air tank or a hydraulic accumulator.

Figure 2:
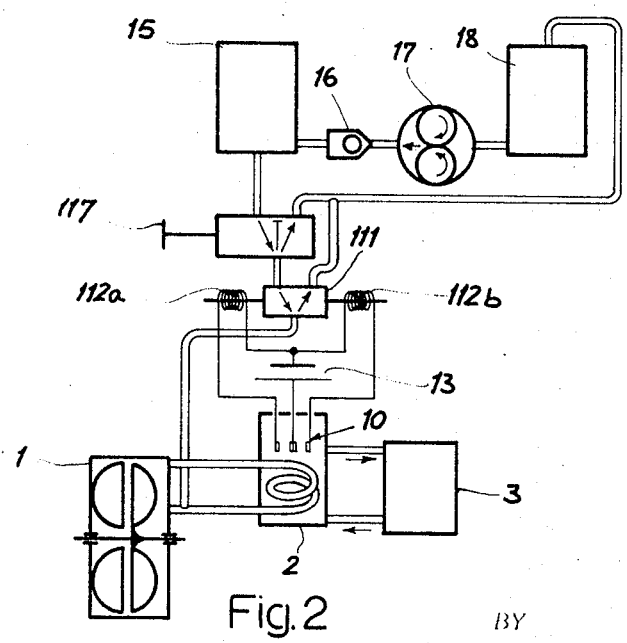

The above and other objects, features, and advantages of the present invention will become more readily apparent from the following description, reference being made to the accompanying drawing in which:

FIG. 1 is a diagram of a hydrodynamic brake system showing the present invention as applied to air-pressure operation; and FIG. 2 is a view similar to FIG. 1 of a hydroulically controlled hydrodynamic brake.

In FIG. 1, I show a hydrodynamic brake 1 of the type described and illustrated in the aforementioned patents and copending application and which comprises a rotor 1a mounted on a shaft 1b which may be connected to the crankshaft 3a of an engine 3b as represented by the diagrammatically illustrated power shaft 1c via universal or cardan joints; the power shaft 1c delivers the engine power to the rear wheel of the truck or semitrailer. The chassis of the vehicle is represented at 1d and carries the hydrodynamic brake housing 1e whose stator 1f is affixed thereto. The hydraulic fluid is fed to the hydrodynamic brake via a line 2a of the brake-fluid circuit and is pumped out through the line 2b. The hydrodynamic brake network is completed by a heat-exchanger coil 2c of a heat exchanger 2 through which the cooling water of an engine cooling system 3 is circulated in indirect liquid-liquid heat exchange.

The cooling system 3 may comprise a line 3c leading the cooling water from the heat exchanger 2 via a pump 3d driven by the engine 3b as represented at 3e, into the radiator 3f at which a stream of air is forced into cooling heat exchange of the water by the engine-driven fan 3g in the usual manner. The cooled water is returned to the engine 3b at 3h and, after having absorbed the engine heat, is passed via line 3i into the chamber of heat exchanger 2 surrounding the pipe coil 2c. Thus, when the hydrodynamic brake is activated, it pumps its brake liquid via line 2b through the heat exchanger coil 2c and returns via line 2a with the hydrodynamic brake heat being transferred to the cooling water in heat exchanger 2. The cooling water is circulated in a conventional cooling network via pump 3d, radiator 3f, line 3h, engine 3b and line 3i.

The hydrodynamic accumulator 1 is controlled, in this embodiment, by a charging cylinder represented at 5 and sustaining a gas pressure at 5a above the hydrodynamic fluid 5b therebelow. The bottom of the charging cylinder 5 is connected via line 5c with the inlet 2a to the hydrodynamic brake 1 while the positive or negative gas pressure is supplied at 5a via a manually operable drum-controlled valve 7 and an electromagnetically operable valve 11. A compressor 8 draws air into the system from line 6 and charges the compressed air tank 4 which is connected via line 4a with the electromagnetically operable valve 11 whose solenoid coils 12a and 12b are respectively connected in series with the ignition battery 13 of the system and contact pairs 10a and 10b of a thermally responsive switch 10 whose sensing elements are located in the path of the cooling water of network 3. Switch 10 may have another set of contacts 10c in circuit with battery 13 and a warning lamp 10d on the dashboard of the vehicle. When the coolant temperature in network 3 is below the predetermined upper level at which the controllable coils 12a and 12b respond, the valve 11 connects line 4a of the compressed air tank 4 with the line 5d of the charging cylinder 5 and drives the hydraulic fluid 5b into the decelerator 1 to render the latter operative when the manually operable valve is in an extreme left-hand position as illustrated. The handle 7a of the brake-actuating valve 7 may be located at the dashboard adjacent the lamp 10d or may carry the latter. The temperature thus rises in the cooling system 3 as heat generated by the braking action of the hydrodynamic brake is transferred to the cooling system. As long as the water temperature is below the predetermined maximum, pressure is maintained in chamber 5a and the hydrodynamic brake 1 remains filled.

When, however, the temperature rises in the cooling system 3 to a level no longer considered acceptable, the thermostat switch 10 energizes the electromagnet 12a, 12b of valve 11 to interrupt the pressure line 4a–5d and connect line 5d with a vent to the atmospher at 11a (downwardly pointing arrow). The pressure falls in chamber 5a and the decelerator 1 is deactivated. When the temperature again falls sufficiently, the valve 12 is operated by the thermal switch 10 to recharge the cylinder 5 with compressed air. When it is desired to apply a negative pressure to this cylinder, as indicated earlier, vent 11a is connected to a suction tank S shown in dot-dash lines in accordance with the principles of the above-mentioned copending application. When, in spite of the fact that the solenoid valve 11 renders the hydraulic decelerator operable, the valve 7 is shifted into its right-hand position to vent line 5d, the charging cylinder 5 is depressurized and the hydraulic decelerator is cut off. Here, too, the port 7b of valve 7 can be connected to the suction tank to fully withdraw fluid from the hydrodynamic decelerator 1. Since no hydrodynamic braking results during this period, the thermostat 10 will no longer be effective to cut in or cut out the valve 11.

In FIG. 2, I show a modified system in which the hydrodynamic brake 1 is charged from a hydraulic accummulator 15 into which hydraulic fluid is pumped via a check valve 16, a hydraulic pump 17 and a reservoir 18. The hydrodynamic network 1, 2, the cooling network 3, the thermoswitch 10 and battery 13 correspond to the similarly numbered parts of FIG. 1. The operation is essentially the same except that, instead of discharging or venting the gas from the compressed air tank to the atmosphere upon operation of the valve 117 or the valve 111 and its coils 112a and 112b, communication is established with the reservoir 18 for pressureless return of fluid to the latter.

At a water temperature below the predetermined maximum, the valve 111 establishes communication between the hydraulic accumulator 15 and the hydrodynamic brake 1 as represented by the downwardly pointing arrow of valve 111 so that the hydrodynamic decelerator 1 is rendered operative as previously described, provided the switch valve 117 for cutting in and out the decelerator is in its left-hand position (represented by downwardly pointed arrow). If, upon operation of the hydrodynamic decelerator, heat is generated in the water-cooling system 3 to bring the temperature to the predetermined maximum, the thermally sensitive switch 10 operates the electromagnetic valve 112a, 112b, 111 to connect the hydrodynamic decelerator 1 with the return reservoir 18 (upwardly extending arrow of valve 111). The hydrodynamic fluid is thus drawn from the decelerator 1 and the latter is deactivated. When the manually operable valve 117 is shifted to the left, the decelerator is drained regardless of the position of valve 111, thereby allowing manual or automatic cutout of the thermal control. When, however, the valve 117 is in the position corresponding to the operative position of decelerator 1 and the temperature in the cooling system 3 falls below the predetermined maximum, thermally responsive switch 10 operates valve 111 to refill the decelerator. In this case, too, negative pressure can be applied to the decelerator to ensure full drainage of fluid therefrom.

I claim:

1. An automotive-vehicle brake system for an automotive vehicle having a liquid-circulation engine-cooling system and a driven member adapted to be braked, said brake system comprising a hydrodynamic brake operatively connected with said member and adapted to be supplied with a brake liquid for displacing said liquid along a closed path and hydrodynamically heating the braking liquid in an operative state of the hydrodynamic brake; liquid-liquid heat exchanger means for transferring heat from said braking liquid to the liquid of said cooling system; control means connected with said hydrodynamic brake for regulating the supply of said braking liquid thereto and selectively rendering said hydrodynamic brake effective and ineffective; and sensing means in the path of the liquid of said engine-cooling system and responsive to the temperature thereof and connected with said control means for deactivating said hydrodynamic brake upon said temperature exceeding a predetermined level.

2. The automotive-vehicle brake system defined in claim 1 wherin said control means includes a source of fluid pressure applicable to said hydrodynamic brake and an electromagnetically operable valve between said source and said hydrodynamic brake, said sensing means comprising a temperature-responsive switch connected in circuit with said electromagnetic valve and having a thermally sensitive element in the path of the liquid circulating through said cooling system.

3. An automotive-vehicle brake system for an automotive vehicle having a liquid-circulation engine-cooling system and a driven member adapted to be braked, said brake system comprising a hydrodynamic brake operatively connected with said member and adapted to be supplied with a brake liquid for displacing said liquid along a closed path and hydrodynamically heating the braking liquid in an operative state of the hydrodynamic brake; liquid-liquid heat exchanger means for transferring heat from said braking liquid to the liquid of said cooling system; control means connected with said hydrodynamic brake for regulating the supply of said braking liquid thereto and selectively rendering said hydrodynamic brake effective and ineffective; and sensing means responsive to the temperature of the liquid of said cooling system connected with said control means for deactivating said hydrodynamic brake upon said temperature exceeding a predetermined level, said control means including a source of fluid pressure applicable to said hydrodynamic brake and an electromagnetically operable valve between said source and said hydrodynamic brake, said sensing means comprising a temperature-responsive switch connected in circuit with said electromagnetic valve and having a thermally sensitive element in the path of the liquid circulating through said cooling system, said control means further comprising means for applying to said hydrodynamic brake a fluid pressure below that of said source and no greater than the ambient atmospheric pressure, said valve being shiftable under the control of said switch to connect the last-mentioned means to said hydrodynamic brake upon said temperature attaining said level and, upon said temperature falling to a predetermined lower level, connecting said source with said hydrodynamic brake.

4. The automotive-vehicle brake system defined in claim 3, further comprising an alerting indicator on the dashboard of asid vehicle and circuit means operatively connecting said switch with said indicator to energize same upon the deactivation of said hydrodynamic brake.

5. The automotive-vehicle brake system defined in claim 3 wherein said last-mentioned means is a source of subatmospheric pressure connectable with said hydrodynamic brake for withdrawing said braking liquid therefrom.

6. The automotive-vehicle brake system defined in claim 3 wherein said source includes a charging cylinder containing said braking liquid under a gas-pressure head.

7. The automotive-vehicle brake system defined in claim 6 wherein said charging source further comprises an air compressor connected to said cylinder for charging same with air pressure.

8. The automotive-vehicle brake system defined in claim 6 wherein said charging cylinder is a hydraulic-pressure accumulator and said source includes a hydraulic-fluid pump.

9. The automotive-vehicle brake system defined in claim 3, further comprising driver-controlled means for rendering effective said electromagnetic valve and said switch.

10. The automotive-vehicle brake system defined in claim 9 wherein said driver-controlled means is a further valve hydraulically connected in series with said electromagnetic valve and said hydrodynamic brake.

References Cited

UNITED STATES PATENTS

| | | |
|---|---|---|
| 1,758,207 | 5/1930 | Walker. |
| 2,667,238 | 1/1954 | Bennett. |
| 2,946,416 | 7/1960 | Snoy _____ 188—90 X |
| 3,136,392 | 6/1964 | Rodway. |
| 3,164,961 | 1/1965 | Schroder _____ 188—90 X |
| 3,265,162 | 8/1966 | Botterill _____ 188—86 |

GEORGE E. A. HALVOSA, Primary Examiner.

U.S. Cl. X.R.

188—264